United States Patent [19]
Podhradsky

[11] Patent Number: 5,978,755
[45] Date of Patent: Nov. 2, 1999

[54] DICTATION DEVICE FOR THE STORAGE OF SPEECH SIGNALS

[75] Inventor: Gerhard Podhradsky, Deutsch Wagram, Austria

[73] Assignee: U.S. Philips Corporation, New York, N.Y.

[21] Appl. No.: 08/812,187

[22] Filed: Mar. 6, 1997

[30] Foreign Application Priority Data

Mar. 11, 1996 [AT] Austria ...................................... 458/96

[51] Int. Cl.⁶ ................................ G10L 3/02; G10L 9/00
[52] U.S. Cl. ............................................ 704/201; 704/200
[58] Field of Search ..................................... 704/201, 200

[56] References Cited

U.S. PATENT DOCUMENTS

5,179,627  1/1993  Sweet et al. ............................ 704/201

*Primary Examiner*—David R. Hudspeth
*Assistant Examiner*—Robert Louis Sax
*Attorney, Agent, or Firm*—Gregory L. Thorne

[57] ABSTRACT

A dictation device for the storage of speech signals comprises processors and generators. The processors are adapted to digitize applied speech signals into data blocks (DB) of comprising digital data with data, a header portion (HP) and a data portion (DP). The data in each data block (DB) is organized in accordance with a specification comprising specification information. The generators are adapted to generate designation records which are each associated with specification. The processors are adapted to generate data blocks (DB) whose header portion (HP) has a first section (HSP-"1") and at least one further section (HSP-"2", HSP-"3", HSP-"4"). The generation means are adapted to generate a designation record (DS3) associated with a specification partner code associated with a specification partner, which designation record can be inserted in the first section (HSP-"1") of a data block (DB). There is also provided generation adapted to generate at least one additional designation record (DS2, DS4, DS5, DS6) associated with additional specification information, which additional designation record can be inserted in a further section (HSP-"2") of the header portion (HP) of a data block (DB).

21 Claims, 4 Drawing Sheets

| SECTION | SPECIFICATION INFORMATION | | | DATA |
|---|---|---|---|---|
| | DEFINITION | FORMAT | BYTES | |
| 1 | NUMBER OF SECTIONS | INTEGER | 2 | 04 |
| | VERSION | ASCII | 3 | 1.0 |
| | AUTHOR | ASCII | 16 | WEBER |
| | PRIORITY | INTEGER | 1 | 0 |
| | START-DATE | ASCII | 6 | YY MM DD |
| | START-TIME | ASCII | 6 | HH MM SS |
| | END-DATA | ASCII | 6 | YY MM DD |
| | END-TIME | ASCII | 6 | HH MM SS |
| | TRANSCRIBER | ASCII | 16 | JAKOBER |
| | SPECIFICATION-PARTNER-CODE | ASCII | 4 | 0632 |
| | ⋮ | | | DS3 |
| SECTION | ADDITIONAL SPECIFICATION | | | DATA |
| | DEFINITION | FORMAT | BYTES | |
| 2 | ENCODE SPEECH | ASCII | 4 | NONE |
| | BRIEF-FORM | ASCII | 1 | 0 |
| | FAX-FORM | ASCII | 1 | 1 |
| | MEMO-FORM | ASCII | 1 | 0 |
| | NUMBER OF WORDS | INTEGER | 6 | 14107 |
| | ⋮ | | DS2 DS4 | DS8 DS5 DS6 |
| 3 | ⋮ | | | |
| 4 | ⋮ | | | |

DICTATION DEVICE FOR THE STORAGE OF SPEECH SIGNALS

BACKGROUND OF THE INVENTION

1. Field of the Invention

The invention relates to a dictation device for the storage of speech signals, comprising input means for receiving the speech signals and for supplying received speech signals, and comprising processing means, arranged after the input means, for processing the speech signals supplied by the input means, which processing means are adapted to digitize the applied speech signals and to generate data blocks comprising digital data, which data blocks comprise a header portion and a data portion, the data in each data block being organized in accordance with a specification comprising specification information, and generated digital speech data, which correspond to digitized speech signals, being insertable in the data portion of a data block, and comprising generation means adapted to generate designation records which are each associated with specification information and which can each be inserted in the header portion of a data block in accordance with the specification, and comprising memory control means for controlling the storage of digital data accommodated in a data block into a memory device.

2. Description of Related Art

Such a dictation device of the type defined in the opening paragraph is known, for example from a dictation system which is commercially available from the Applicant under the type designation VS 4000. This known dictation system comprises a personal computer including interface cards, dictation recording/reproducing stations and transcription stations connected to the personal computer via telephone lines, and at least one monitor connected to the personal computer for the optical reproduction of information. In this known dictation system the generation means are adapted to generate a plurality of designation records each associated with specification information, i.e. an author designation record, which designates the author of a dictation, and a data block designation record, which designates a data block—generally referred to as a "file"—having a given number, and a priority designation record which specifies the priority for the transcription of a dictation, and time designation records which specify the date and time of the beginning and the date and time of the end of a dictation, and a length designation record which specifies the length of a dictation in minutes, as well as a transcriber designation record which designates a certain transcriber who should transcribe a previously stored dictation. In the known dictation system VS 4000 the above-mentioned designation records can be included in the header portion of a data block in accordance with the relevant specification, specification information of the specification being assigned to each designation record.

SUMMARY OF THE INVENTION

It is an object of the invention to improve a dictation device of the type defined in the opening paragraph in a simple manner and to broaden the possibilities attainable with such a dictation device and, particularly, to adapt these to different requirements and wishes of different specification partners, the term specification partners being understood to means mainly companies which either manufacture such dictation devices or have them manufactured and sell them and which observe the specification rules laid down in a specification. Such a specification may also have the status of an internationally accepted standard.

According to the invention, in order to achieve the above-mentioned object in a dictation device of the type defined in the opening paragraph, the processing means are adapted to generate data blocks whose header portion comprises a first section and at least one further section, and the generation means are adapted to generate a designation record associated with a specification partner code, which code is associated with a specification partner and provides specification information and which designation record can be inserted in the first section of the header portion of a data block, and there have been provided further generation means adapted to generate at least one additional designation record associated with additional specification information, which additional designation record can be inserted in one of the further sections of the header portion of a data block in accordance with an additional specification associated with the specification partner code and selectable by a specification partner, which additional specification includes at least one item of additional specification information.

By means of the measures in accordance with the invention it is achieved in a particularly simple manner and substantially without any additional materials that a designation record associated with a given specification-partner code can be added to any data block generated by means of a dictation device in accordance with the invention and that, moreover, at least one additional designation record can be added to any data block generated, which additional designation record is associated with additional specification information of an additional specification which can be selected freely by a specification partner and which is associated with a specification-partner code. In a specification for a dictation device in accordance with the invention this makes it possible to define a basic specification which holds for and is binding upon all specification partners and which can be extended arbitrarily with a partner-specific additional specification by any specification partner, the designation records associated with the specification information of the basic specification being included in the first section of the header portion of a record and the additional designation records associated with the additional specification information of the additional specification being included in at least one of the further sections of the header portion of a data block. Suitably, the designation records corresponding to the basic specification can be read and processed by all the dictation devices in accordance with the invention of the all the specification partners, which guarantees a fundamental compatibility as regards the reading and processing capability of all the data blocks (files) generated, while in addition the advantage is obtained that by means of the additional designation records a multitude of partner-specific and compatibility-independent additional functions and additional modes of operation can be realized. An advantageous further possibility is that additional specification information and associated additional designation records of a plurality of specifications of specification partners can be stored in a dictation device in accordance with the invention of a specification partner and that during operation of such a dictation device in accordance with the invention allowance can be made for the specifications of several specification partners, which differ as regards the additional specifications.

In a dictation device in accordance with the invention the generation means can be adapted to generate a designation record associated with a letter-digit combination or a letter combination as the specification-partner code. Such a letter combination can be, for example, the company name or a short form or abbreviation of the company name. However, it has also proved to be advantageous if the generation means are adapted to generate a number associated with a specification partner code as a designation record. The use of numbers representing specification-partner codes has proved to be advantageous in view of a simple and clear distinction.

In a dictation device in accordance with the invention it has also proved to be advantageous if the further generation means comprise a keyboard. This has the advantage that practically any additional designation record can be generated easily.

In a dictation device in accordance with the invention it has also proved to be advantageous if the further generations means are constituted by at least a part of the processing means. This is advantageous in view of a simple construction and also in view of the fact that an additional designation record can readily be generated automatically by at least a part of the processing means during the generation of a data block.

In a dictation device adapted to read stored digital speech data corresponding to digitized speech signals from the memory device, and in which the read-out of the digital data contained in a data block from the memory device is controlled by the memory control means, and in which the read-out digital speech data corresponding to digitized speech signals can be applied to the processing means—as is known from the afore-mentioned dictation system bearing the type designation VS 4000—it has proved to be advantageous if there has been provided a further memory device for the storage of at least one data record which is associated with the specification partner code of a specification partner and which can be entered into the dictation device upon instruction of said specification partner during an initialization of said dictation device, and there have been provide comparison means by which a designation record, which is associated with a specification partner code, which is accommodated in the first section of the header portion of a data block, and which is obtained when the data block is read, and a data record, which is associated with a specification partner code and which has been stored in the further memory device during an initialization of the dictation device, can be compared with one another to generate detection information representative of the comparison result. Thus, it is simply achieved that in such a dictation device in accordance with the invention it is easy to detect whether the designation record associated with a specification-partner code, included in the first section of the header portion of a data block and obtained when the data block is read, and a record associated with a specification-partner code, stored in the further memory device upon initialization of this dictation device, are identical or differ from one another, after which measures which are dependent on the resulting detection information can be initiated in the dictation device. For example, in the case that in such a dictation device in accordance with the invention the comparison means detect that the designation record associated with a specification-partner code, included in a data block and obtained when the data block is read, and a record associated with a specification-partner code, stored in the further memory device upon initialization of this dictation device, are not identical, warning information for the user of dictation device can be generated; however, in such a case it is also possible that in such a dictation device in accordance with the invention, which is programmed in accordance with the record associated with a "regular" specification-partner code and stored in its further memory device, additional software available in this dictation device is activated, which corresponds to a designation record associated with an "extraneous" specification-partner code, in which case this dictation device offers additional operating features corresponding to the additionally activated software and, as a result of this, can subsequently process the digital data, particularly the speech data, included in the data block from which the designation record associated with the "extraneous" specification-partner code has been derived. With respect to said initialization of a dictation device in accordance with the invention it is to be noted that such an initialization can be effected during the manufacture of such a dictation device but that in the case of a software-based dictation device, which can for example be implemented by means of a personal computer but which may also be constituted by a separate dictation machine, this is also possible by loading a new program, for example to replace an old program.

In a dictation device of the kind defined in the preceding paragraph it has proved to be particularly advantageous if, in addition, there have been provided display means capable of displaying, in dependence on the detection information representative of the comparison result, at least information corresponding to a designation record or an additional designation record included in one of the sections of the header portion of a data block. Thus, it is achieved in a simple manner that the information defined by the designation records and additional designation records and included in the sections of the header portion of a record can be displayed, which can, for example, considerably simplify the operation of a such a dictation device.

In a dictation device in accordance with the invention it has further proved to be particularly advantageous if at least a part of the processing means is adapted to process speech data in dependence upon at least one additional designation record. Thus, it is achieved in a particularly simple manner that at least a part of the processing means of a dictation device in accordance with the invention can simply be adapted to at least one partner-specific additional designation record.

In the above context it has proved to be very advantageous if in a dictation device in accordance with the invention the processing means comprise encoding means and decoding means for encoding and decoding speech data applied to them, and the decoding means and the decoding means are adapted to encode and decode applied speech data in dependence upon an additional designation record characterizing the encoding and decoding. Thus, it is achieved in a simple manner that a possible encoding and decoding of speech data can be activated in dependence on an additional designation record characterizing the encoding and decoding.

The afore-mentioned as well as further aspects of the invention will be apparent from the exemplary embodiments described hereinafter and will be elucidated by means of these exemplary embodiments.

BRIEF DESCRIPTION OF THE DRAWINGS

The invention will now be described in more detail with reference to the drawings, which show two exemplary embodiments to which the invention is not limited.

DETAILED DESCRIPTION OF THE PREFERRED EMBODIMENTS

Figure 1:
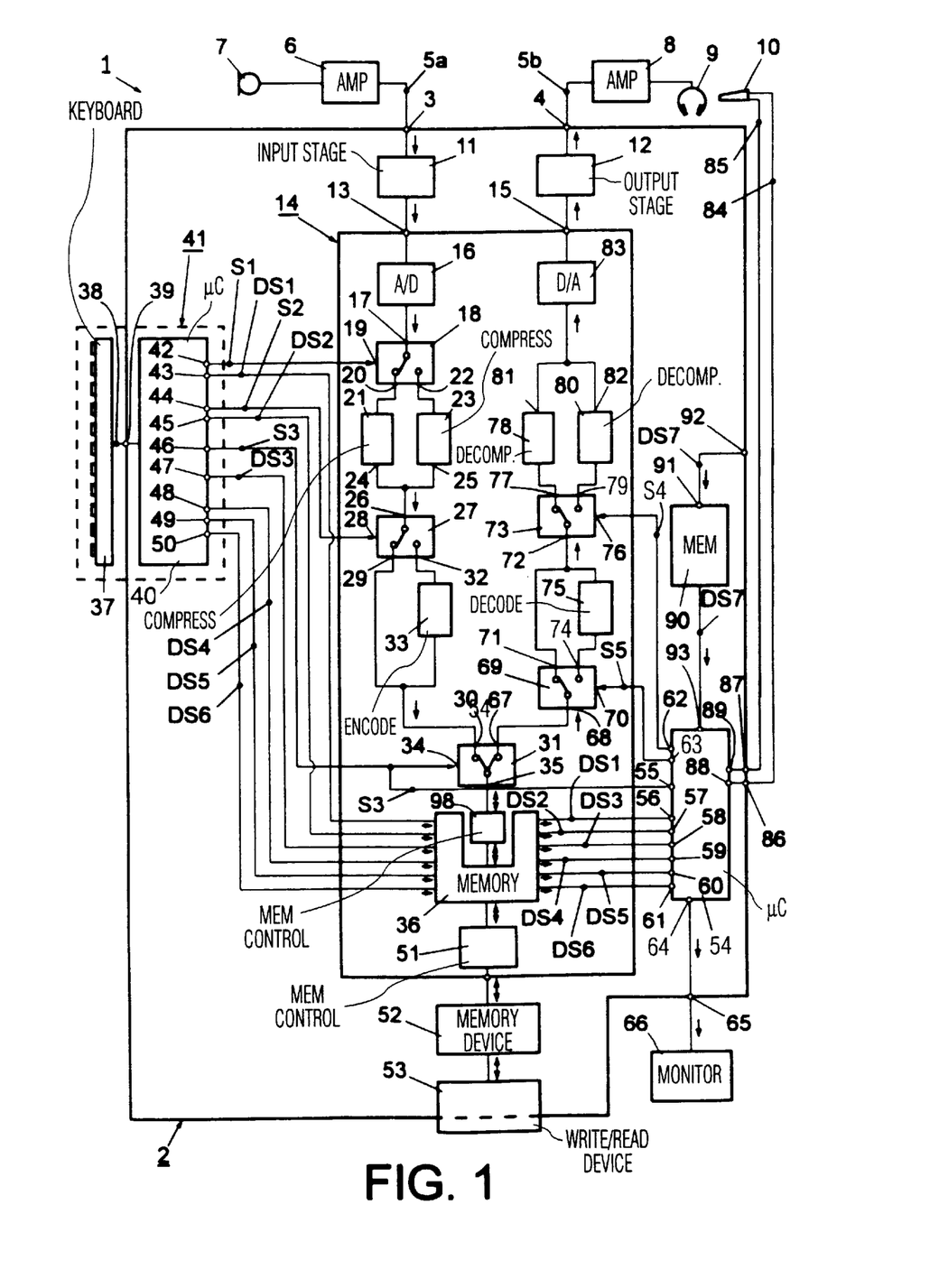
FIG. 1 shows diagrammatically a dictation device in accordance with a first embodiment of the invention implemented by means of a personal computer and comprising processing means for the generation of data blocks.

FIG. 1 shows diagrammatically a dictation device 1 for the storage of speech signals. In the present case the dictation device 1 includes a personal computer 2, which has an input terminal 3 and an output terminal 4. A signal amplifier device 6 is connected to the input terminal 3 via a connection 5a, which is shown diagrammatically. Connected to the signal amplifier device 6 is a microphone 7 by means of which acoustic speech signals of a dictation can be converted into electric speech signals, which are applied to the signal amplifier device 6, from which the electric speech signals are applied to the input terminal 3 of the personal computer 2 via the connection 5a.

A further signal amplifier device 8 is connected to the output terminal 4 of the personal computer 2 via a further connection 5b, a headset 9 being connected to the further signal amplifier device for the acoustic reproduction of the reproduced speech signals during the transcription of a dictation. During the transcription of a dictation a foot switch 10 is used for control purposes, as will be described in detail hereinafter. By means of the headset 9 a transcriber can monitor and transcribe dictations which correspond to the reproduced electric signals applied to the further signal amplifier device 8 via the output terminal 4 and the further connection 5b and from this amplifier device to the headset 9, the foot switch 10 enabling the playback of the dictations to be stopped and a repeated playback of dictated passages to be started.

The signal amplifier devices 6 and 8 can also be incorporated directly in the personal computer 2, in which case the microphone 7 and the headset 9 can be connected directly to the connection sockets of the personal computer 2.

The input terminal 3 of the personal computer 2 is connected to an input stage 11. The output terminal 4 of the personal computer 2 is connected to an output stage 12. The input stage 11 is connected to an input 13 of processing means 14, which have an output 15 connected to the output stage 12. The input stage 11 serves to receive the speech signals applied to the input terminal 3 and to supply the received speech signals to the input 13 of the processing means 14. The output stage 12 serves to receive the speech signals supplied by the processing means 14 on the output 15 of these means and to apply these speech signals to the output terminal 4. By means of the input stage 11 and the output stage 12 it is possible, for example, to adapt the signal level. If such a signal level adaptation can be effected in the signal amplifier devices 6 and 8, the input stage 11 and the output stage 12 may be dispensed with.

The processing means 14 inter alia serve to process the speech signals supplied to its input 13 by the input stage 11. The processing means 14 are adapted to digitize the speech signals applied to them and to generate data blocks of digital data, which data blocks comprise a header portion and a data portion, as will be described in more detail hereinafter.

For this purpose, the processing means 14 comprise an analog-to-digital converter 16 connected to the input 13. A first switching device 18 has an input 17 connected to the analog-to-digital converter 16 and has a control input 19 arranged to receive a control signal S1 for switching over the switching device. The first switching device 18 has a first output 20 connected to a first data compression device 21 and has a second output 22 connected to a second data compression device 23. The digital speech data supplied by the analog-to-digital converter 16 can be compressed by means of the two data compression devices 21 and 23. The two data compression device 21 and 23 differ with respect to the data compression attainable by each of them, the first data compression device 21 providing a comparatively high data compression and the second data compression device 23 providing a comparatively low data compression.

The outputs 24 and 25 of the two data compression devices 21 and 23 are connected to an input 26 of a second switching device 27. A control signal S2 for switching over the second switching device 27 can be applied to the second switching device 27 via a control input 28. A first output 29 of the second switching device 27 is connected directly to a first terminal 30 of a third switching device 31. A second output 32 of the second switching device 27 is connected to the first terminal 30 of the third switching device 31 via a data encoding device 33. The compressed speech data supplied by one of the two data compression devices 21 and 23 can be encoded by means of the data encoding device 33. It is to be noted that the digital speech data may alternatively be encoded before compression of the digital speech data. However, it is likewise possible to compress and encode the digital data concurrently. A control signal S3, by which the third switching device 31 can be switched over, can be applied to a control input 34 of the third switching device 31.

The first switching device 18 serves to enable the processing means 14 to be switched between two compression modes which differ with respect to the attainable compression, one of the two data compression devices 21 and 23 being activated in accordance with the compression mode.

The second switching device 27 serves to enable the processing means 14 to be switched between two different encoding modes, the digital speech data not being encoded in the one encoding mode and the digital speech data being encoded by means of the encoding device 33 in the other encoding mode. In this respect it is to be noted already that in the present case the data encoding device 33 is adapted to encode the applied speech data in dependence upon the occurrence of an additional designation record which designates the encoding mode, which will be described in further detail hereinafter.

The third switching device 31 serves to switch between a "recording" or "write" mode and a "reproduction" or "read" mode. In the "write" mode the digital speech data applied to the first terminal 30 of the third switching device 31 are applied to a memory device, i.e. a RAM 36, via a third terminal 35 of the third switching device 31, in which RAM they are stored temporarily. The digital speech data are stored in the RAM 36 as data blocks DB, which are obtained by means of a memory control device 98 and one of which is shown diagrammatically in FIG. 2.

Figure 2:
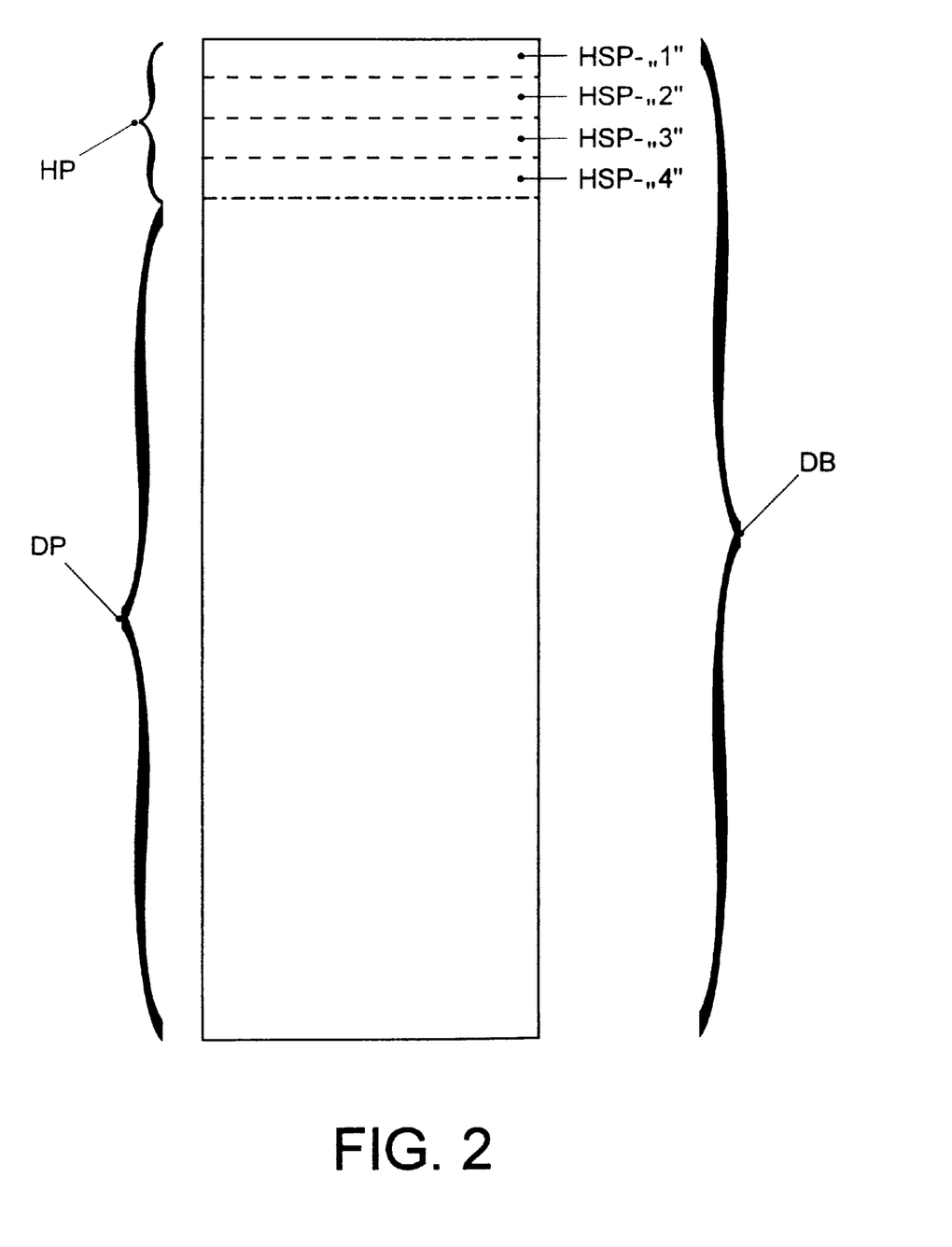
FIG. 2 shows diagrammatically the structure of a data block generated with the processing means of the dictation device shown in FIG. 1, which data block comprises a header portion and a data portion.

As is apparent from FIG. 2, the processing means 14 and particularly the memory control device 98 are adapted to generate data blocks DB having a header portion HP and a data portion DP. In the present case, the processing means 14 and particularly the memory control device 98 are adapted to generate data blocks DB whose header portion HP comprises a first section HSP-"1" and, in the present case, three further sections HSP-"2", HSP-"3" and HSP-"4".

Figure 3:
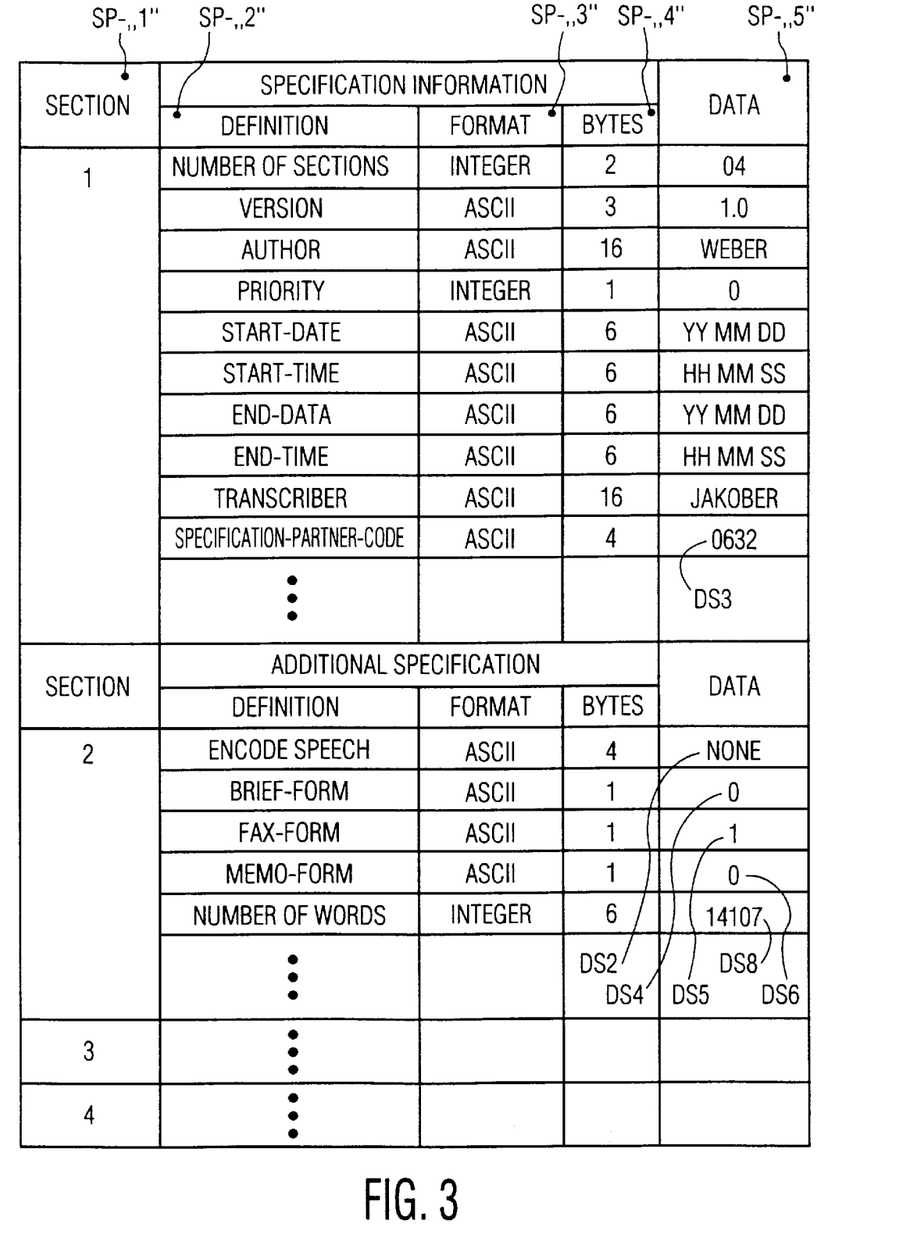
FIG. 3 shows a part of a specification including specification information associated with designation records, the designation records each being included in the header portion of a data block as shown in FIG. 2 in compliance with the specification.

The data in each data block DB are organized in accordance with a specification whose principal elements are represented diagrammatically in the form of a table in FIG. 3. The first column SP-"1" gives the consecutive numbers "n" of the sections HSP-"n". The columns SP-"2", SP-"3" and SP-"4" give the so-termed specification information, the second column SP-"2" listing the definitions of the individual items of specification information. The third column SP-"3" gives the format and the fourth column SP-"4" gives the number of bytes, with which format and number of bytes a designation record associated with specification information listed in the fifth column SP-"5" can be generated, can be included in a section HSP-"n" and can subsequently be stored.

The specification given in FIG. 3 is a specification which is intended for use by a multitude of partners. Herein, specification partners are to be understood to mean mainly companies which either manufacture dictation devices of the present type or which have these devices manufactured and sell them, and which observe the specification rules laid down in a specification.

The specification given in FIG. 3 includes so-termed specification information which defines a basic specification which holds for and is binding upon all specification partners. Moreover, this specification specifies the designation records associated with the specification information (see column SP-"5"), which records can be included in the first section HSP-"1" of the header portion HP of a data block DB. This basic specification now also includes hitherto unknown specification information in the form of a specification partner code, which is associated with a designation record, in the present case a number representing the specification partner code, for example the number "0632". Instead of a number the designation record can be a letter combination or a digit-letter combination.

The specification given in FIG. 3 further includes so-termed additional specification information defining an additional specification which can be selected by a given specification partner and which is associated with the specification partner code included in the basic specification, in which additional specification each specification partner can lay down partner-specific specification rules which he desires. Moreover, this specification includes the additional designation records (see column SP-"5") which are associated with the additional specification information and which can be included in the second section HSP-"2" of the header portion HP of a data block DB.

As definitions of the specification information of the basic specification, whose associated designation records can be accommodated in the first section HSP-"1" of the header portion HP of a data block DB, the specification given in FIG. 3 includes the following definitions, which are briefly explained below:
1. the number of sections HSP-"n" included in the header portion HP of each data block DB
2. the numerical designation of the version of the relevant specification
3. the name of the author of the dictation
4. the indication about the priority, i.e. the importance or urgency, with which a dictation is to be transcribed
5. the date, i.e. year, month and day, at which a dictation started
6. the time in hours, minutes and seconds, at which a dictation started
7. the date, i.e. year, month and day, at which a dictation ended
8. the time in hours, minutes and seconds, at which a dictation ended
9. the name of a transcriber who should transcribe a dictation
10. the specification partner code assigned to and associated with a specification partner.

It is to be noted that in practice further specification information will be defined, which is not given in FIG. 3. Moreover, it is to be noted that in the basic specification enough room has been reserved to define further specification information and to include this in the basic specification.

As definitions of the additional specification information of the additional specification desired and laid down by the specification partner having the number "0632" as designation record in the present example of a specification, the specification given in FIG. 3 includes the following definitions, which are briefly explained below:
1. an indication whether speech data should be encoded or not
2. an indication that a dictation should be transcribed in the form of a letter
3. an indication that a dictation is to be transcribed in the form of a facsimile message, i.e. for example on a facsimile form
4. an indication that a dictation is to be transcribed in the form of a memo
5. an indication about the number of words of a dictation.

In practice further additional specification information will be defined, but for the sake of clarity this is not shown in FIG. 3.

With respect to digital speech data obtained with the aid of the processing means 14 of the dictation device 1 shown in FIG. 1 by digitization of the speech signals applied to the processing means 14, it is to be noted that these digital speech data can be accommodated in the data portion DP of a data block DB.

The dictation device 1 shown in FIG. 1 comprises a keyboard 37. The keyboard 37 is connected to a connection device 39, for example a miulti-pole connector, of the personal computer 2 via a connection 38, shown diagrammatically. A first microcomputer 40 is connected to the connection device 39. The keyboard 37 and the first microcomputer 40 together constitute generation means 41 by which a plurality of control signals and a plurality of data signals can be generated, which will be described in more detail hereinafter.

The keyboard 37 serves and is adapted to enter control commands into the personal computer 2 and to enter alphanumeric characters into the personal computer 2. By means of the keyboard it is possible to enter inter alia the following control commands into the personal computer 2 of the dictation device 1:
1. Starting the "recording" or "write" mode
2. Starting the "reproduction" or "read" mode
3. Starting the compression mode with a comparatively high data compression or compression rate
4. Starting the compression mode with a comparatively low data compression or compression rate
5. Starting the encoding mode
6. Stopping the encoding mode
7. Beginning of a dictation
8. End of a dictation
9. Dictation to be transcribed with priority
10. Various further control commands, not described any further.

Moreover, alphanumeric characters can be input into the personal computer 2 by means of the keyboard 37. By means of the keyboard 37 for example the following information can be input into the personal computer 2:

1. Name of the author of a dictation
2. Name of the transcriber who should transcribe a dictation
3. Name of a person to be billed for the transcription of a dictation
4. Information that a dictation is to be transcribed in the form of a letter
5. Information that a dictation is to be transcribed in the form of a facsimile message
6. Information that a dictation is to be transcribed in the form of a memo
7. further information not described in further detail.

In response to the control commands and alphanumeric characters generated by means of the keyboard 37 the first microcomputer 40 generates various control signals and data records, particularly designation records, which can be included in the header portion HP of a data block DB in accordance with the specification given in FIG. 3.

After it has received an appropriate control command to start a given compression mode from the keyboard 37, the first microcomputer 40 produces on an output 42 the control signals S1 for switching over the first switching device 18, which signal is applied to the control input 19 of the first switching device 18 to change over the compression modes. In accordance with the control signal S1 produced on the output 42 the first microcomputer 40 produces a data record DS1 on a further output 43, which record contains the information about which of the two compression modes is active in the dictation device 1, i.e. in the processing means 14 of this device. The record DS1 is applied to the RAM 36. It is to be noted that in the dictation device 1 shown in FIG. 1 the data record DS1 together with the speech data is accommodated in the data portion DP of a data block DB, but this will not be described any further.

After it has received an appropriate control command to start or stop the encoding mode from the keyboard 37, the first microcomputer 40 produces on a further output 44 the control signals S2 for switching over the second switching device 27, which signal is applied to the control input 28 of the second switching device 27. In accordance with the second control signal S2 the first microcomputer 40 produces a further data record, namely an additional designation record DS2, on a further output 45, which record indicates whether or not the encoding mode is active in the dictation device 1, i.e. in the processing means thereof. The additional designation record DS2 is also applied to the RAM 36 and included in the second section HSP-"2" of the header portion HP of a data block DB, as indicated in FIG. 3. Put differently, this means that the processing means 14 are adapted to encode the applied speech data in dependence upon the occurrence of an additional designation record which designates encoding, i.e. the additional designation record DS2.

On a further output 46 the first microcomputer 40 produces the control signal S3 for switching over the third switching device 31, which control signal is applied to the control input 34 of the third switching device 31. When the control command for starting the "recording" or "write" mode is entered by means of the keyboard 37, this results in the control signal S3 appearing on the output 46, in such a form that the third switching device 31 is set to the switching position shown as a solid line in FIG. 3.

When the control command "beginning of a dictation" is given by means of the keyboard, the first microcomputer 40 produces a data record, namely a designation record DS3, on a further output 47. This designation record DS3 is generated in that a program started by said control command "beginning of a dictation" is carried out in the first microcomputer 40. The designation record DS3 represents the number associated with a specification partner and representing the specification partner code associated with this specification partner. The designation record DS3 is also applied to the RAM 36 and is then inserted in the first section HSP-"1" of the header portion HP of a data block DB, as indicated in FIG. 3.

When by means of the keyboard 37 information is applied to the personal computer 2 that a dictation is to be transcribed as a letter, the first microcomputer 40 produces an additional designation record DS4 on a further output 48, which record contains the information that a reproduced dictation is to be described in the form of a letter, the record also being applied to the RAM 36 and being inserted in the second section HSP-"2" of the header portion HP of a data block DB, as is indicated in FIG. 3.

After entry of an appropriate control command by means of the keyboard 37 an additional designation record DS5 is produced on a further output 49 of the first microcomputer 40 in an exactly similar way and indicates that a reproduced dictation is to be transcribed in the form of a facsimile message, which record is also applied to the RAM 36 and is then inserted in the second section HSP-"2" of the header portion HP of a data block, as is shown in FIG. 3.

In a manner similar to that described above the first microcomputer 40 produces an additional designation record DS6 on a further output 50, indicating that a reproduced dictation is to be transcribed in the form of a memo, which record is also applied to the RAM 36 and is then inserted in the second section HSP-"2" of the header portion HP of a data block, as is shown in FIG. 3.

It is to be noted that in the embodiment of the dictation device 1 shown in FIG. 1 the data records DS1, DS2, DS3, DS4, DS5 and DS6 are applied directly to the RAM 36. In a very advantageous embodiment which is not shown in FIG. 1, the data records DS1, DS2, DS3, DS4, DS5 and DS6 are loaded into the RAM 36 by means of the memory control device 98.

Furthermore, it is to be noted that the generation means 41, which include the keyboard 37 and the first microcomputer 40, are adapted not only to generate the designation records but, as is apparent from the above description, also to generate the additional designation records and thus also form the further generation means for generating designation records.

In the personal computer 2 of the dictation device 1 shown in FIG. 2 the processing means 14 further comprise memory control means 51, which control the storage of the digital data stored temporarily in the RAM 36 into a memory device 52. In the present case, memory device 52 is formed by a hard disk storage device, which stores the digital data on a hard disk.

The personal computer 2 of the dictation device 1 shown in FIG. 1 further comprises a write/read device 53 for writing onto and reading from a floppy disk. In this way it is possible to read dictations previously stored on a floppy disk in another dictation device from this floppy disk after the latter has been loaded into the write/read device 53 of the personal computer 2 and to store these data in the memory device 52. A dictation device with a personal computer may also include a write/read station for writing onto and reading from a memory card, i.e. a memory card in which a solid-state memory has been incorporated, which station is adapted to receive such a memory card. Such a memory card forms an advantageous medium which can be inscribed and read out in various dictation devices, which devices may also be formed by a portable hand-held pocket dictation machine.

The dictation device 1 is adapted to read digital speech data corresponding to digitized speech signals and stored in the memory device 52 from this memory device 52. During such a read-out of digital speech data from the memory device 52 the digital data contained in a data block DB is read from the memory device 52 under control of the memory control means 51, similarly to the read-in of the digital data into the memory device 52. Digital speech data corresponding to digitized speech signals read from the memory device 52 can be applied to the processing means 14, the speech data thus read-out under control of the memory control means 51 being applied to the RAM 36.

In the dictation device 1 shown in FIG. 1 the personal computer 2 comprises a second microcomputer 54. The control signal S3 produced on the output 46 of the first microcomputer 40 is applied to an input 55 of the second microcomputer 54, so that via the input 55 the second microcomputer 54 receives an indication whether the dictation device 1 has been set to the "recording" or "write" mode or to the "reproduction" or "read" mode.

When the dictation device 1 is in the "reproduction" or "read" mode a part of the digital data of a data block DB buffered in the RAM 36 during read-out is loaded into the second microcomputer 54, i.e. the second microcomputer 54 receives the data record DS1 via a further input 56, which record contains information about which of the compression modes has been used during the storage of digitized speech data, it receives the additional designation record DS2 via a further input 57, which record contains information about the encoding mode selected for recording digital speech data, it receives the designation record DS3 via a further input 58, which record corresponds to the numeral generated in the "recording" mode and representing a specification partner code, and it receives the designation records DS4, DS5 and DS6 via further inputs 59, 60 and 61, which records contain information about a desired transcription as a letter, a facsimile message or a memo, respectively.

In accordance with the data record DS1 applied to the input 56 of the second microcomputer 54 the second microcomputer 54 generates a control signal S4, which appears on an output 62 of the second microcomputer 54 and which serves to select one of two data decompression modes, which correspond to the two data compression modes that can be selected during the recording of a dictation.

With the aid of the designation record DS2 applied to its input 57 the second microcomputer 54 generates a control signal S5, which appears on a further output 63 of the second microcomputer 54 and which enables one of two decoding modes to be selected, which mode corresponds to one of the two decoding modes that can be selected during the recording of a dictation.

With the aid of the designation records DS4, DS5 and DS6 applied to its inputs 59, 60 and 61 the second microcomputer 54 generates information which can be applied to a monitor 66 via a further output 64 of the second microcomputer 54 and a further connection device 65 of the personal computer 2 to display an indication, for example in the form of text, on the monitor 66, from which a transcriber using the dictation device 1 can infer in which form a dictation is to be transcribed, i.e. in the form of a letter, a fax or a memo.

When the dictation device 1 is in the "reproduction" or "read" mode the control signal S3 is applied to the third switching device 31 from the output 46 of the first microcomputer 31 so as to set the third switching device 31 to the switching position shown as a broken line in FIG. 1. In this switching position the third terminal 35 of the third switching device 31, which is connected to the RAM 36 via the memory control device 98, is then connected to a second terminal 67 of the third switching device 31. The second terminal 67 is connected to an input 68 of a fourth switching device 69, which has a control input 70 arranged to receive the control signal S5 from the output 63 of the second microcomputer 54. A first output 71 of the fourth switching device 69 is connected directly to an input 72 of a fifth switching device 73. A second output 74 of the fourth switching device 69 is connected to the input 72 of the fifth switching device 73 via a data decoding device 75. The fifth switching device 73 has a control input 76 arranged to receive the control signal S4 form the output 62 of the second microcomputer 54 to change over the fifth switching device 73. A first output 77 of the fifth switching device 72 is connected to a first data decompression device 78 and a second output 79 of the fifth switching device 73 is connected to a second data decompression device 80. The two outputs 81 and 82 of the two data decompression devices 78 and 79 are connected to a digital-to-analog converter 83, which is connected to the output 15 of the processing means 14.

In the dictation device 1 shown in FIG. 1 the fourth switching device 69 and the fifth switching device 73 are advantageously switched over fully automatically in dependence on the additional designation record DS2, included in the second section HSP-"2" of the header portion HP of the data block DB being read, and in dependence on the data record DS1 included in the data portion DP of the data block DB being read together with the speech data, because the two control signals S5 and S4 are automatically derived from the two afore-mentioned data records DS2 and DS1 by means of the second microcomputer 54.

The dictation device 1 shown in FIG. 1 comprises a cable connection between the foot switch 10 and the personal computer 2, via which connection a d.c. supply voltage can be applied to the foot switch 10 in a manner not shown and of which two lines 84 and 85 are shown, which are connected to two terminals 86 and 87 of a connector of the personal computer 2 via a connector, not shown. The two terminals 86 and 87 are connected to two control inputs 88 and 89 of the second microcomputer 54. By means of the lines 84 and 85 control signals can be applied to the control inputs 88 and 89 of the second microcomputer 54, the control signal applied to the control input 88 result in a normal reproduction of speech signals in the headset 9 and the control signal applied to the control input 89 resulting in a return to a previously reproduced dictation passage. Such control functions of a foot switch are customary.

The personal computer 2 in the dictation device 1 shown in FIG. 1 comprises a further memory device 90. This memory device 90 has an input 91 connected to a further connection device 92 of the personal computer 2. During the manufacture of the dictation device 1 or the personal computer 2 it is possible to connect a generation device, for example via a modem, which generation device can generate at least a data record DS7, which is associated with a detection partner code assigned to a specification partner and which can be applied to the further memory device 90 via the connection device 92 and the input 91. In this way at least one data record DS7, which is associated with the specification partner code of a specification partner and which can be loaded into the dictation device 1 during the manufacture of the dictation device 1 or the personal computer 2 on instruction of this specification partner, can be stored in this further memory device 90. In the case a dictation device 1 with a personal computer 2 it is possible, as an alternative for such a connection device 92, the at least one data record DS7 can be loaded by means a floppy disk insertable into the write/read device 53 during an initialization process, in which software is loaded into and consequently installed in the personal computer 2 via the read/write device 53. Instead of by means of a floppy disk the least one data record DS7 can also be loaded by means of a memory card comprising a solid-state memory if the personal computer comprises a suitable write/read device.

The dictation device 1 shown in FIG. 1 comprises comparison means by which a designation record DS3, which is associated with a specification partner code, which is accommodated in the first section HSPP-"1" of the header portion HP of a data block DB, and which is obtained when the data block DB is read, and a data record DS7, which is associated with a specification partner code, which has been loaded into the dictation device 1 during the manufacture or initialization of the dictation device 1 and which is read from this further memory device, can be compared with one another. In the present case these comparison means are simply formed by the second microcomputer 54, the data record DS7 read from the further memory device 90 being applied to a further input 93 of this microcomputer. The second microcomputer 54 compares said two data records DS3 and DS7 with one another and in response to this comparison generates detection information representing the comparison result. In the present case, as a result of this detection information generated in the second microcomputer 54, at least one designation record or additional designation record included in one of the sections HSP-"n" of the header portion HP of a data block DB is transferred from the RAM 36 into the second microcomputer 54 and by means of the at least one data record thus transferred information that can be displayed on the monitor 66 is generated and is applied to the monitor 66 in order to be displayed thereon.

When the data record DS7 associated with a specification partner code and applied from the further memory device 90 to the second microcomputer 54 does not correspond to the designation record DS3 associated with a specification partner code and derived from the data block DB read from the memory device 52, the two mutually different numbers representing the specification partner code can be displayed on the monitor 66 in response to the detection information generated by means of the second microcomputer 54. It is to be noted that the second microcomputer 54 detects different data records DS3 and DS7, which are each associated with a specification partner code, for example, if the designation record DS3 associated with an "extraneous" specification partner code and derived from a data block read from the memory device 52, stems from a data block which has been stored in the memory device 52 via the write/read device 53 and has been generated by means of a dictation device by which during the generation of the relevant data block a designation record DS3 generated in this dictation device and associated with the "extraneous" specification partner code.

In the case that different data records DS3 and DS7, which are each associated with a specification partner code, are detected it is also conceivable that not only the data of the data record associated with a specification partner code "extraneous" to the present dictation device 1 and derived from a read-out data block DB is displayed on the monitor 66, but that in the case that the designation records of a plurality of specifications, i.e. also the designation records of specifications of other specification partners, information corresponding to said plurality of specifications, has been stored in the dictation device 2, information corresponding to a plurality of specifications is displayed on the monitor 66, this information being obtained by means of designation records corresponding to the specification information of "extraneous" specifications. In the case that the data of "extraneous" specifications has been stored in the dictation device 1 shown in FIG. 1 it is also possible to activate a program corresponding to an "extraneous" specification partner code when a designation record DS3 associated with this "extraneous" specification partner code is detected, after which the device 1 is suitable for and capable of processing a data block including a designation record DS3 associated with an "extraneous" specification partner code owing to this reprogramming of the dictation device.

As is apparent from the above description the range of application of the dictation device 1 shown in FIG. 1 is extended considerably by the measures in accordance with the invention applied to the dictation device 1. By means of the measures in accordance with the invention it is achieved that in spite of different partner-specific specifications and, consequently, different partner-specific records in the data blocks (files) a basic compatibility as regards the readability and processability of interchangeable data blocks (files) is guaranteed owing to the designation records which correspond to the basic specification and which are equal for all the records.

Figure 4:
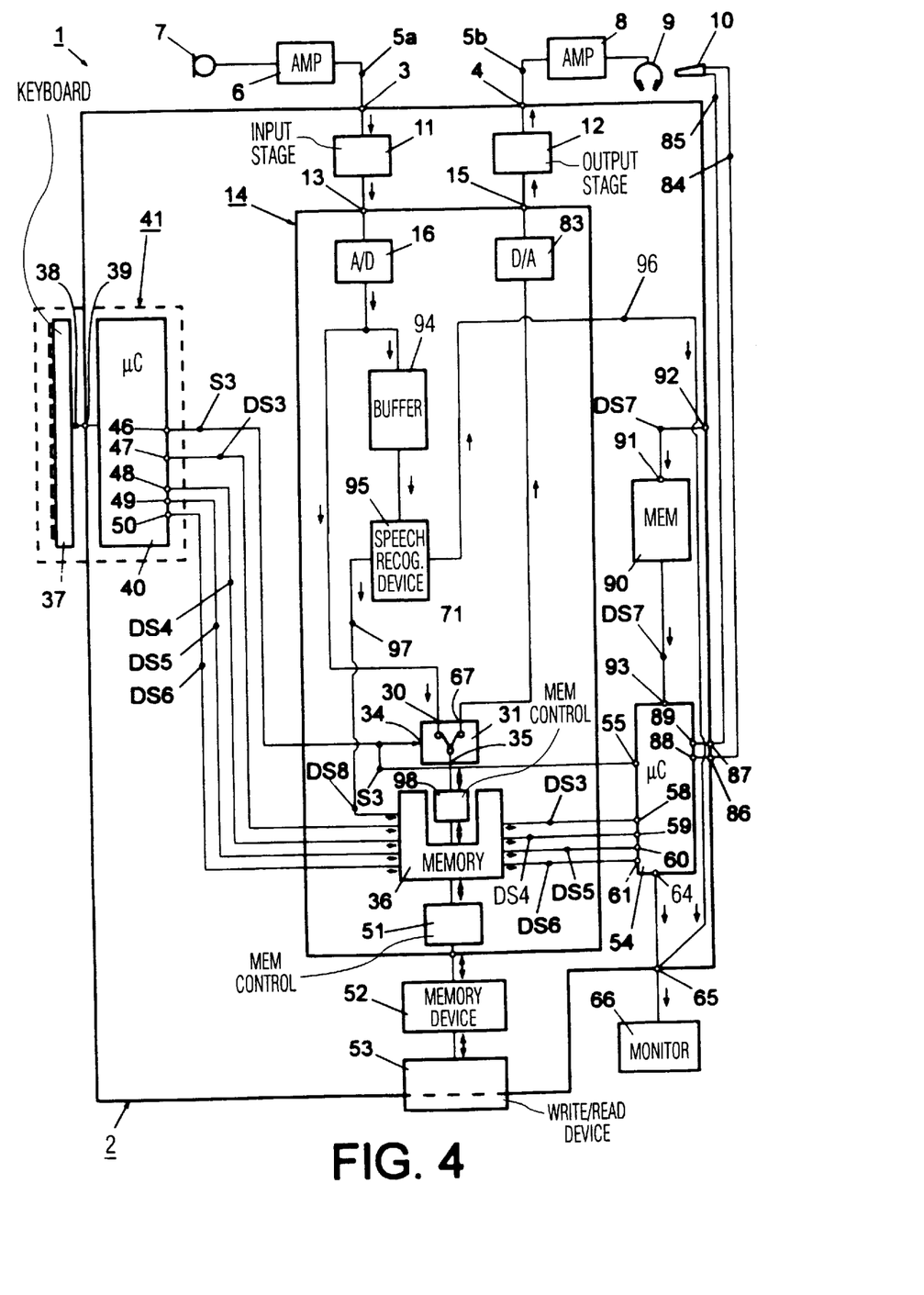
FIG. 4 shows diagrammatically a dictation device in accordance with a second embodiment of the invention, in which the processing means for the generation of data blocks include a speech recognition device.

The processing means 14 in the dictation device 1 shown in FIG. 4, as compared with the dictation device 1 shown in FIG. 1, do not comprise any data compression devices, a data encoding device, a data decoding device nor any data decompression devices, as a result of which digital speech data supplied by the analog-to-digital converter 16 in the "write" mode are, in principle, applied directly to the RAM 36 via the switching device 31 and the memory control device 98, and the speech data applied to the switching device 31 by the RAM 36 via the memory control device 98 in the "read" mode are supplied directly to the digital-to-analog converter 83.

In the dictation device 1 shown in FIG. 4 the analog-to-digital converter 16 is additionally connected to a buffer memory 94, which can be formed by a separate memory but which, in practice, is formed by a part of the RAM 36 or a part of the memory device 52 (hard disk). A speech recognition device 95 is connected to the buffer memory 94 and enables the individual words of a dictation to be recognized. Words recognized by means of the speech recognition device 95 can be applied in the form of data to the monitor 66 via a connection 96 and the further connection device 65 of the personal computer 2 in order to display the recognized words in the form of text.

In the dictation device 1 a connection 97 has been provided between the speech recognition device 95 and the RAM 36, via which connection, after termination of a dictation, which is effected for example by giving an appropriate control command by means of the keyboard 37, a data record DS8 representing a plurality of words in a completed dictation can be applied to the RAM 36, which data record is stored in the RAM 36 by means of the memory control device 98. The data record DS8 can then be inserted as an additional designation record in the second section HSP-"2" of the header portion HP of a data block DB, as is shown merely by way of illustration in FIG. 3. The additional designation record DS8, which provides information about the number of words in a dictation, can be used, for example when a dictation is transcribed or when a dictation has been completed, to bill for example the author of the dictation, the amount of the bill being based on the number of transcribed words, i.e. the number of words comprised in a dictation.

With respect to the diagrammatic representation of the dictation devices in FIGS. 1 and 4 and the relevant description it is to be noted explicitly that a serial arrangement of the individual function blocks has been chosen in order to simplify the description and understanding of the functions but, in reality, at least a major part of the function blocks shown being realized by cycling through program or software blocks, the program cycles and the attendant data exchanges or transfers between the various memory units being controlled by means of a central processor unit and the control by means of the central processor unit and the data exchange between the memory units being effected via a bus system.

The invention is not limited to the exemplary embodiments described hereinbefore. For example, it is also possible to include the concept of "spoken instructions" as additional specification information in an additional specification, in which case digitized speech data corresponding to the spoken instructions dictated by an author—which relate for example to special wishes of the author as regards the processing and transcription of his dictation by a transcriber—are inserted in accordance with this definition into at least one further section of the header portion of a data block as additional designation records generated by the further generation means, a comparatively large number of sections, up to some hundreds of sections, being required in the case of long spoken instructions in order to store the resulting digital speech data. An additional specification may include the concept of "fonts" as a definition of specification information, the further generation means of a dictation device in accordance with the invention then being adapted to generate an additional designation record associated with a different font. In both dictation devices in accordance with the invention described above generation means for generating designation records and further generation means for generating additional designation records are implemented by means of the same units, i.e. by means of a keyboard and a microcomputer. However, the generation means and the further generation means may also be constructed as separate units. Similarly to the aforementioned dictation system bearing the type designation VS 4000, the dictation device in accordance with the invention can be constructed as a central dictation system comprising a central dictation processing station and dictation recording/reproduction stations and dictation transcription stations, which communicate with the dictation processing station via private and/or public telephone lines. A dictation device in accordance with the invention can also be constructed as a so-termed desk-top dictation machine which is placed on, for example, a desk top during operation, or as a so-termed pocket dictation machine which is hand-held in operation.

I claim:

1. A dictation device for the storage of speech signals, said device comprising:

an input means configured to receive speech signals;

a processing means configured to receive and digitize said received speech signals and to generate data blocks comprising digital data organized in accordance with a specification comprising specification information, said data blocks having a header portion and a data portion, said header portion having a first section and at least one further section, and said data portion being configured to contain the digitized speech signals; and a designation record generation means configured to generate a first designation record and at least one additional designation record, said first designation record being associated with said specification information and being inserted in said first section of said header portion in accordance with said specification, wherein said first designation record is associated with a first specification partner code that is associated with at least one of a plurality of specification partners, and said at least one additional designation record being associated with additional specification information and being inserted in one of said at least one further section of said header portion in accordance with an additional specification which includes at least one item of additional specification information, wherein said at least one additional designation record is associated with a second specification partner code and is selectable by at least one of said plurality of specification partners.

2. A dictation device as claimed in claim 1, characterized in that said designation record generation means is adapted to generate a number associated with said first specification partner code as said first designation record.

3. A dictation device as claimed in claim 1, characterized in that said designation record generation means includes a keyboard.

4. A dictation device as claimed in claim 1, characterized in that said designation record generation means is formed by at least a part of the processing means.

5. The dictation device of claim 1, further comprising:

a memory device adapted to store a data record which is associated with a specification partner code of one of said plurality of specification partners, which said data record is entered into the dictation device upon instruction of said one of said plurality of specification partners during an initialization of said dictation device; and a comparison means, adapted to compare said first designation record, with said data record, and generate detection information representative of the comparison result.

6. A dictation device as claimed in claim 5, further comprising a display means capable of displaying, in dependence on the detection information representative of the comparison result, at least information corresponding to said designation record or said at least one additional designation record.

7. A dictation device as claimed in claim 1, characterized in that at least a part of the processing means is adapted to process speech data in dependence upon said at least one additional designation record.

8. A dictation device as claimed in claim 7, characterized in that the processing means comprise encoding means and decoding means adapted for encoding and decoding speech data in dependence upon said at least one additional designation record.

9. A dictation device as claimed in claim 2, characterized in that said designation record generation means is formed by at least a part of the processing means.

10. The dictation device of claim 2, further comprising:

a memory device adapted to store a data record which is associated with a specification partner code of one of said plurality of specification partners, which said data record is entered into the dictation device upon instruction of said one of said plurality of specification partners during an initialization of said dictation device; and a comparison means, adapted to compare said first designation record, with said data record, and generate detection information representative of the comparison result.

11. The dictation device of claim 3, further comprising:

a memory device adapted to store a data record which is associated with a specification partner code of one of said plurality of specification partners, which said data record is entered into the dictation device upon instruction of said one of said plurality of specification partners during an initialization of said dictation device; and a comparison means, adapted to compare said first designation record, with said data record, and generate detection information representative of the comparison result.

12. A dictation device as claimed in claim 10, further comprising a display means capable of displaying, in dependence on the detection information representative of the comparison result, at least information corresponding to said designation record or said at least one additional designation record.

13. A dictation device as claimed in claim 11, further comprising a display means capable of displaying, in dependence on the detection information representative of the comparison result, at least information corresponding to said designation record or said at least one additional designation record.

14. A dictation device as claimed in claim 2, characterized in that at least a part of the processing means is adapted to process speech data in dependence upon said at least one additional designation record.

15. A dictation device as claimed in claim 5, characterized in that at least a part of the processing means is adapted to process speech data in dependence upon said at least one additional designation record.

16. A dictation device as claimed in claim 6, characterized in that at least a part of the processing means is adapted to process speech data in dependence upon said at least one additional designation record.

17. A dictation device as claimed in claim 14, characterized in that the processing means comprise encoding means and decoding means adapted for encoding and decoding speech data in dependence upon said at least one additional designation record.

18. A dictation device as claimed in claim 16, characterized in that the processing means comprise encoding means and decoding means adapted for encoding and decoding speech data in dependence upon said at least one additional designation record.

19. A method of storing speech signals comprising the steps of:

receiving the speech signals, digitizing the received speech signals, generating data blocks comprising digital data organized in accordance with a specification comprising specification information, said data blocks having a header portion and a data portion, said header portion having a first section and at least one further section, wherein digital speech data, which correspond to the digitized speech signals, is included in the data portion of at least one of said data blocks, generating designation records which are each associated with specification information and which are each included in the header portion of at least one of said data blocks in accordance with the specification, wherein one of said designation records is included in the first section of the header portion of at least one of said data blocks and is associated with a specification partner code that is associated with at least one of a plurality of specification partners, and wherein at least one additional designation record associated with additional specification information is included in one of said at least one further section of the header portion of at least one of said data blocks in accordance with an additional specification associated with the specification partner code and selectable by at least one of said specification partners, which additional specification includes at least one item of additional specification information.

20. The method of claim 19, further comprising the steps of:

storing a data record upon instruction of said one of said plurality of specification partners during an initialization sequence, which data record is associated with the specification partner code of one of said plurality of specification partners;

comparing said first designation record with said data record; and generating detection information representative of the comparison result.

21. A method of storing speech signals comprising the steps of:

receiving the speech signals, digitizing the received speech signals, generating data blocks comprising digital data organized in accordance with a specification comprising specification information, said data blocks having a header portion and a data portion, said header portion having a first section and at least one further section, wherein digital speech data, which correspond to the digitized speech signals, is included in the data portion of at least one of said data blocks, generating designation records which are each associated with specification information and which are each included in the header portion of at least one of said data blocks in accordance with the specification, wherein one of said designation records is included in the first section of the header portion and is associated with each one of a plurality of specification partners, and wherein at least one additional designation record associated with additional specification information is included in one of said at least one further section of the header portion in accordance with an additional specification selectable by at least one of said specification partners, which additional specification includes at least one item of additional specification information.

* * * * *